Figure 1:
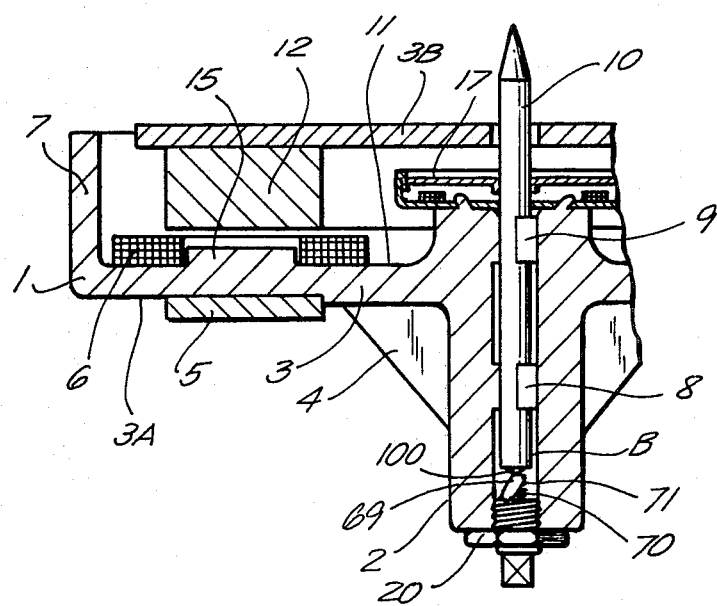

United States Patent [19]

Müller

[11] 4,357,550
[45] Nov. 2, 1982

[54] BRUSHLESS D.C. MOTOR

[76] Inventor: Siegfried Müller, Bühlstr. 14 a, D 7742 St. Georgen, Fed. Rep. of Germany

[21] Appl. No.: 111,991

[22] Filed: Jan. 14, 1980

[30] Foreign Application Priority Data

Jan. 16, 1979 [CH] Switzerland .................. 401/79

[51] Int. Cl.³ .............................................. H02K 1/04
[52] U.S. Cl. ..................................... 310/43; 310/157; 310/268; 310/90
[58] Field of Search .................... 310/268, 43, 157, 90; 274/1 E

[56] References Cited

U.S. PATENT DOCUMENTS

| 3,354,332 | 11/1967 | Bonnefoy | 310/268 |
| 3,678,314 | 7/1972 | Carter | 310/268 |
| 3,932,069 | 1/1976 | Giardini et al. | 310/268 X |
| 4,072,874 | 2/1978 | Arnold, Jr. | 310/268 |
| 4,079,277 | 3/1978 | Osanai | 310/268 X |
| 4,208,784 | 6/1980 | Kince | 310/286 X |

Primary Examiner—Donovan F. Duggan
Attorney, Agent, or Firm—Michael J. Striker

[57] ABSTRACT

The invention relates to a collectorless D.C. motor with a horizontal air gap, particularly a low-speed motor for the direct drive of recording and/or reproducing devices. As per invention, the rotor axle is supported within an axial bore of the motor housing, with the motor housing made of plastic. The stator winding and the magnetic return structure are fixedly arranged on the motor housing which is also provided with bores for attaching the motor on installing it into the device. Obviating of machining sequences, simplification of assembly and direct support of the rotor axle in the motor housing all contribute to a reduction in manufacturing cost.

10 Claims, 1 Drawing Figure

BRUSHLESS D.C. MOTOR

The invention relates to a collectorless D.C. motor with horizontal air gap, particularly a low-speed motor for the direct drive of signal-processing recording and-/or reproducing devices.

At present, motors of this type mainly have a coreless stator winding arranged in the air gap, with their field, preferably a rotatable field, acting upon a permanent magnet located between the parts of the magnetic return structure.

As per the DE Letters of Disclosure Nos. 21 43 752 and 24 24 290, and the U.S. Pat. Nos. 3,845,339 and 4,125,792, such a motor has become known.

In these motor arrangements, the stator winding is centrally held from the inside in a carrier plate at the die cast motor housing. In the axial direction, the stator winding is located in the usual manner between a permanent magnet and the second magnetic return structure which also rotates with the rotor. Locating the stator winding on the motor housing, correctly locating it in its spatial relation to the permanent magnet and the magnetic return structure, both require a high manufacturing expenditure caused by machining to a high precision for assembling and for the motor housing produced by die casting.

As per DE Letter of Disclosure No. 25 33 187, U.S. Ser. No. 708,092, a further motor of this type is known in which, except for its face side, the rotor is also surrounded by a die cast motor housing in which the rotor bearing as well is centrally located. The individual plate-shaped coils of the stator winding are attached with their outer rim to the motor housing and project in the direction of the motor axle within the horizontal air gap between pemanent magnet and magnetic return structure. That design also has a tacho-generator, the gear disc of which is attached with further components to the motor shaft after assembly of the motor. A point bearing for axial support of the rotor shaft is arranged herein at the cover cap which also concomitantly shields the tacho-generator towards the outside against electrical and magnetic fields of interference. With this motor, too, several machining sequences of high precision, a multitude of assembly sequences and expensive components of high precision are required, all of these having an unfavorable influence on the manufacturing cost of such a motor.

DE Letter of Disclosure No. 27 18 482 and U.S. Pat. No. 4,164,690 show a motor for driving a small compact blower. In this known motor, the magnetic return structure is not attached to the rotor but arranged below the stator winding on a base plate from plastic. A bearing tube to hold the bearing is arranged vertical to it on the base plate. The axial force acting from the permanent magnet onto the magnetic return structure rests against the ball bearing and holds rotor and stator together. In its assembly technique, this design is also more simple than motors of the letters of disclosure named afore, but considerably lower demands relative to smooth and synchronous running are put forward for the usually high-speed drive motor for a blower.

The invention is based upon the object of reducing the manufacturing cost by obviating machining sequences and simplifying assembly, with adequate quality (for motors of this type) in respect of smooth and synchronous running.

As per invention, this object is realized by the motor housing consisting of plastic, by providing an axial bore in the plastic of the motor housing and by rotatably supporting the rotor axle within the axial bore.

The advantage of the invention rests on the fact that expenditure for producing the motor can be considerably lowered because the known casting and injecting techniques may be used in production, the former delivering parts of very exact dimensions. This will also improve smooth and synchronous running.

Other advantages can, furthermore, be achieved: Magnetic return structures and the stator winding may, for instance, be fixedly arranged at the motor housing by attaching them, also together with other components, to the motor housing by bonding or by detenting or compression connections. Otherwise, such components may together be joined to the plastic by injection molding.

By arranging the rotor bearing as a bore in the plastic of the motor housing, the bearing may readily be given different shapes by using appropriately shaped steel mandrels in casting. Thus the bearing surfaces may be cylindrical, with three or more flats, thread-shaped or provided with axially interrupted bearing surfaces.

The bearing pressure can be varied by appropriately narrow bores, since the plastic can, to a limited extent, elastically adapt itself to the rotor shaft. Thrust bearings may be constructed rigid or adjustable. It will be simple to store larger quantities or lubricants in the windenings of the bores, so that motors of longer life can also be produced.

If higher demands are to be put to the running properties of the bearings, a different plastic, for instance with particularly good running properties may be used in the supporting zone of the bore.

Contact elements for the dissipation of electrostatic charges of the rotor may be provided within the bore. Further advantageous embodiments, such as for instance those described in the patent claims, are, furthermore, possible.

An embodiment of the invention is depicted in the drawing and will be described closer below.

Shown in:

FIG. 1 truncated, a longitudinal section through a motor as per invention.

The rotor axle 10 is radially and axially supported in a bore (B) of the one-piece motor housing 1. The plate-like housing bottom 3 is mechanically reinforced by the webs 4 distributed around the circumference and supported toward the stem 2. A magnetic return structure 5 from ferrite is arranged at the lower side of the housing bottom, and the stator winding 6 at the opposite side. The permanent magnet 12, connected with the rotor axle 10 over the disc 11, will in operation be put into motion by the field of the stator winding 6, with the magnetic return structure 5 forming the requisite magnetic return.

Strong axially directed magnetic forces between the permanent magnet 12 and the return structure 5 act in such a manner that the rotor axle 10 is attracted axially towards to bottom part of the bore (B) and will firmly rest with its spherical end 100 nearly point like, against the motor housing 1. Additional means for axially securing rotor and stator against falling apart are, therefore, not required.

The bore of the stem 2 is matched as to its diameter to the shaft diameter and provided with preferably defined bearing locations. This will prevent that bending of the rotor axle or of the bore in the stem 2 could encumber the rotor rotation by binding.

Shaping of the bearing locations 8, 9 is made during production by means of mandrels. Various solutions are possible herein, e.g. two bearing locations at an axial distance, with cylindrical bearing surfaces or such with two or multiple, internal-thread-like, axially or radially offset or interrupted bearing surfaces for supporting the rotor axle 10 in the motor housing 1. Every space within the bore not occupied by the rotor axle 10 will simultaneously serve as lubricant storage.

In another embodiment the bearing bore diameter at the bearing loci 8, 9 is of differing dimensions and will vary between the bearing loci either in steps or gradually, in order to allow better removal of the plastic component from the mold, the lower bearing location 8 having herein the smaller bearing diameter. The appurtenant rotor axle 10 is appropriately adapted in its dimensions in order to attain small bearing plays. With a running through cylindrical bore in the stem 2, the motor axle 10 is provided with its "own" bearing loci, wherein two cylindrical zones of a larger diameter and an axial distance to each other form the bearing loci.

To adapt the bore diameter to the rotor axle 10, a small narrowing of the bore by, e.g. wedge-shaped projections on the bearing surfaces is possible. These will be pressed at their tips in an outward direction by the rotor axle 10, whereby the rotor axle 10 is supported in the bore with a small bearing play. Using a mandrel with axial recesses, the bore will have projections in an axial direction, shaped f.i. like a wedge, which form the bearing surface for the rotor axle and which also may be slightly deformed by the rotor axle 10 in order to obtain small bearing plays.

Injection molding of the motor housing from two different materials is also possible with advantage. Herein, a material of higher mechanical stability f.i. glass-fiber reinforced plastic or a die-cast component is used for the housing itself, whilst a plastic with good bearing properties is selected for the rotor support in the zone of the bore.

If needed, the bearing surfaces for supporting the rotor axle 10 in the bore of the motor housing 10 are not smooth as when injected, but slightly roughened in order to improve forming of an oil film by better wetting of the plastic between the rotor axle 10 and the bearing surfaces in the bore.

Apart from the above, it is also possible to insert a bearing bushing for the radial and, in given instances also, axial, support of the rotor axle 10. This is conceivable particularly for high-speed drives, since these require an improved supply of the bearing loci with lubricant and smaller bearing plays to reduce running noises.

The magnetic return structure 5 is preferably joined to the motor housing 1 in the manner as shown, i.e. as an external disc-shaped insert or integrated into the housing bottom 3, more or less enclosed by the plastic of the motor housing 1. It is also possible to construct the magnetic return structure 5 with a smaller inner and larger outer diameter and with a plurality of stamped-out recesses, preferably outside of the annular eefective zone of the permanent magnet. During injection molding, the bores are permeated by plastic, and the magnetic return structure 5 will essentially increase the mechanical stability of the motor housing 1. Perts of the magnetic return structure 5 will herein project with connecting bores from the motor housing 1 above the rim 7 or provision is made in the zone of the housing bottom 3 for threads serving for installing the motor in the device. The magnetic return structure is of one piece, bur may also be constructed of a plurality of pieces, or it may have variations in its cross-section, spaced corresponding to the pole spacing, in order to obtain a momentum of reluctance in the direction of rotation.

The stator winding 6 is a formed spool and fixed in space by appropriately constructed projections or recesses 15 of the motor housing 1. Attachment of the stator winding 6 is accomplished by bonding, by thermoplastic deformation of the material of the motor housing, and it is also concenivable to fix the stator winding in the motor housing 1 by injection molding. Attachment by bonding or thermoplastic deformation is also possible for the magnetic return structure 5. Special measures for insulating the stator winding may be forgone since the motor housing is made from plastic. Spatial fixing and locating of other motor components, e.g. a Hall generator or parts of the tacho-generator by the method as described afore is also possible. These parts or components of the control circuit may, herein, be arranged on a printed circuit.

As far as electrostatic charges of the rotor are to be avoided, a springing contact element 70 is provided in the stem 2, which has a contact with the rotor axle 10 in the zone of the axial bearing location 100 and which will safely dissipate the charges to the ground over a conducting connection.

In order to keep the frictional load upon the contact to a low level, the point of contact is located near to the approximately point like support of the convex curved face side 100 of the rotor axle 10.

The braking momentum exerted by the contact elements upon the rotor axle 10 can thus be appropriately minimized, even if the contact is touching the rotor axle 10 by two contact arms 69 and symmetrically to the point-like support point in the motor housing.

Use of plastic for the motor housing 1, dispensing with machining sequences on the stator, and attaching, or inserting respectively, of the magnetic return structure 5, the stator winding 6 and the stationary elements of the tacho-generator 17 to the motor housing 1, all at low cost, and the simple assembly of the motor by merely having to join stator and rotor, will jointly and severally reduce the production cost for this motor.

An embodiment of the rotor support in the stem 2 of the motor housing 1, as per the subordinated claims, or arrangement of the speed indicator within the space between the magnetic return structure 11 and the inner diameter of the permanent magnet 12 is of advantage not only for motors as per this general category, but also, in principle, for all electric motors.

The basic idea of the invention (vide claim 1) may also be applied to motors with a rotating magnetic return structure (as, f.i. described in detail in the German Letters of Disclosure Nos. 21 43 752 and 25 33 178), U.S. Pat. No. 3,845,339, Ser. No. 708,092).

It is also readily possible to make the thrust bearing of the motor 20 adjustable, for instance by a thread, so that, respectively, the air gap or the elevation of the end of the rotor shaft 11 may easily be optimized.

I claim:

1. In a commutatorless D.C. motor with a plane air gap and a rotor shaft, particularly for use as a direct drive of signal-processing recording and/or reproducing devices, an improvement comprising a plastic motor housing having a bore extending perpendicular to the plane of the air gap, said rotor shaft being received in said bore, said bore being shaped so as to form at least two bearing surfaces supporting the rotor shaft and to further form spaces between the rotor shaft and the housing, said spaces containing lubricant; and a thrust bearing located at a lower end of the bore and supporting a lower end of the rotor shaft.

2. The improvement defined by claim 1, further including a magnetic return structure fixed to the plastic housing on at least a lower face thereof.

3. The improvement defined by claim 2, wherein the magnetic return structure has a cross-section which varies circumferentially in accordance with pole spacing in the motor, whereby a momentum of reluctance is generated.

4. The improvement defined by claim 1, wherein the bearing surfaces are cylindrical.

5. The improvement defined by claim 4, wherein at least two of the bearing surfaces are unequal in diameter.

6. The improvement defined by claim 1, wherein the thrust bearing is adjustable.

7. The improvement defined by claim 1, further including an element contacting the rotor shaft when the rotor shaft is received within the bore, whereby electrostatic charges accumulated on a rotor attached to the rotor shaft may be discharged to ground through the element.

8. The improvement defined by claim 1, wherein the rotor shaft has a convexly curved lower end.

9. The improvement defined by claim 8, further including at least one element contacting the rotor shaft at its lower end, whereby electrostatic charges accumulated on a rotor attached to the rotor shaft may be discharged to ground through said at least one element.

10. The improvement defined by claim 1, wherein the bearing surfaces have deformable projections which deform when the rotor shaft has been received within the bore, whereby bearing play is minimized.

* * * * *